US008206488B2

(12) United States Patent
Mantkowski

(10) Patent No.: US 8,206,488 B2
(45) Date of Patent: Jun. 26, 2012

(54) FLUORIDE ION CLEANING METHOD

(75) Inventor: Thomas E. Mantkowski, Madeira, OH (US)

(73) Assignee: General Electric Company, Schenectady, NY (US)

( * ) Notice: Subject to any disclaimer, the term of this patent is extended or adjusted under 35 U.S.C. 154(b) by 356 days.

(21) Appl. No.: 12/262,730

(22) Filed: Oct. 31, 2008

(65) Prior Publication Data

US 2010/0107871 A1 May 6, 2010

(51) Int. Cl.
*B01D 53/04* (2006.01)
*B01D 53/34* (2006.01)
*B08B 5/00* (2006.01)

(52) U.S. Cl. .................. 95/131; 134/2; 134/19; 134/31; 423/240 R; 423/464; 423/483; 423/488; 423/493

(58) Field of Classification Search ............... 95/92, 210
See application file for complete search history.

(56) References Cited

U.S. PATENT DOCUMENTS

| | | | |
|---|---|---|---|
| 3,490,958 A | | 1/1970 | Robinson, Jr. |
| 4,098,450 A | * | 7/1978 | Keller et al. .................. 228/119 |
| 4,405,379 A | * | 9/1983 | Chasteen .......................... 134/2 |
| 4,975,147 A | * | 12/1990 | Tahara et al. ..................... 216/77 |
| 5,118,359 A | * | 6/1992 | Li et al. ............................. 134/42 |
| 5,435,982 A | * | 7/1995 | Wilkinson ..................... 423/437.1 |
| 5,906,797 A | * | 5/1999 | Orihara et al. ................. 422/177 |
| 6,416,589 B1 | * | 7/2002 | Lipkin et al. ..................... 134/19 |
| 2003/0129118 A1 | * | 7/2003 | Miller ........................... 423/383 |
| 2007/0087208 A1 | | 4/2007 | Ng et al. |
| 2009/0107000 A1 | | 4/2009 | Oetjen |

FOREIGN PATENT DOCUMENTS

| | | |
|---|---|---|
| WO | 0048751 A1 | 8/2000 |
| WO | 2007048698 A1 | 5/2007 |

OTHER PUBLICATIONS

"Fluoride ion cleaning of gas turbine components using PTFE grease", M.T.Kim,S.Y.Chang,O.Y.Oh,J.B.Won; Surface & Coating Technology 200, 2006, pp. 6740-6748.*
"Fluoride ion cleaning of gas turbine components using PTFE grease", Kim et al, Surface & Coating Technology, 200 (2006), p. 6740-6748.*
International Search Report issued in connection with PCT Application No. PCT/US2009/061120 on Jan. 22, 2010.
Kim M T et al: "Fluorida ion cleaning of gas turbine components using PTFE grease" Surface and Coatings Technology, Aug. 1, 2006, pp. 6740-6748, vol. 200 issue 24, Elsevier, Amsterdam, NL.
International Search Report issued in connection with corresponding PCT Application No. PCT/US2009/061119 on Apr. 27, 2010.

* cited by examiner

*Primary Examiner* — Duane Smith
*Assistant Examiner* — Ives Wu
(74) *Attorney, Agent, or Firm* — William Scott Andes; Gary M. Hartman; Domenica N. S. Hartman

(57) ABSTRACT

A fluoride ion cleaning method includes generating hydrogen fluoride (HF) gas in-situ in a cleaning retort; contacting a part in need of cleaning with the generated HF gas; scrubbing an initial effluent stream in-situ to substantially remove residual HF gas therefrom; and passing the scrubbed effluent gas stream out of the cleaning retort. In an exemplary method, a liquid or gaseous halogenated feedstock is introduced into a cleaning retort; hydrogen gas is introduced into the cleaning retort, HF gas is generated by a reaction of the feedstock with hydrogen gas at a sufficient temperature. In an exemplary method, only HF gas generated in-situ or reconstituted in-situ is utilized in the cleaning process.

13 Claims, 2 Drawing Sheets

FLUORIDE ION CLEANING METHOD

BACKGROUND OF THE INVENTION

This invention relates generally to systems, methods, and apparatuses for fluoride ion cleaning, and more specifically to in situ generation and capture of hydrogen fluoride gas used to clean components, including components comprising superalloy material.

Fluoride Ion Cleaning (FIC) is used to remove oxides from field-run hot gas path components in preparation for subsequent braze repair operations. Current FIC techniques either suffer from reduced effectiveness due to the limited availability of HF gas in the process or are burdened by high equipment and maintenance costs stemming from the use of bottled HF gas as a reactant.

Commercially available dynamic FIC equipment currently uses bottled HF gas as the source material. Because HF is an extreme toxin, its use requires expensive, relatively complicated equipment in order to safely handle the HF. In addition, since HF must be used in excess in the cleaning process, the effluent stream also contains HF, requiring a scrubber system and its necessary ancillaries. This combination tends to drive users to employ larger equipment which is segregated from the normal process cells to obtain some economy of scale with the gas handling and treatment systems.

Accordingly, it would be desirable to have an effective cleaning method without the associated downfalls of the use of bottled HF gas a source material. Further, it would be desirable to provide an effective cleaning method that reduces or eliminates the need for a separate scrubber system to remove excess HF from the effluent stream.

BRIEF DESCRIPTION OF THE INVENTION

The above-mentioned need or needs may be met by exemplary embodiments which provide a process for in-situ generation of HF within a cleaning retort and removes excessive HF before releasing an effluent stream from the cleaning retort.

In an exemplary embodiment, there is provided a method comprising: generating hydrogen fluoride (HF) gas in-situ in a cleaning retort; contacting a part in need of cleaning with the generated HF gas; scrubbing an initial effluent stream in-situ to substantially remove residual HF gas therefrom; and passing the scrubbed effluent gas stream out of the cleaning retort.

In an exemplary embodiment, there is provided a method comprising: introducing a liquid or gaseous halogenated feedstock into a cleaning retort; introducing hydrogen gas into a cleaning retort; heating the cleaning retort to a temperature sufficient to generate HF gas in-situ through a reaction of the feedstock and the hydrogen gas; and utilizing only HF gas generated in-situ from the reaction of the feedstock and the hydrogen gas or a combination of HF gas generated in-situ and in-situ reconstituted HF in the cleaning retort.

BRIEF DESCRIPTION OF THE DRAWINGS

The subject matter which is regarded as the invention is particularly pointed out and distinctly claimed in the concluding part of the specification. The invention, however, may be best understood by reference to the following description taken in conjunction with the accompanying drawing figures in which:

DETAILED DESCRIPTION OF THE INVENTION

Figure 1:
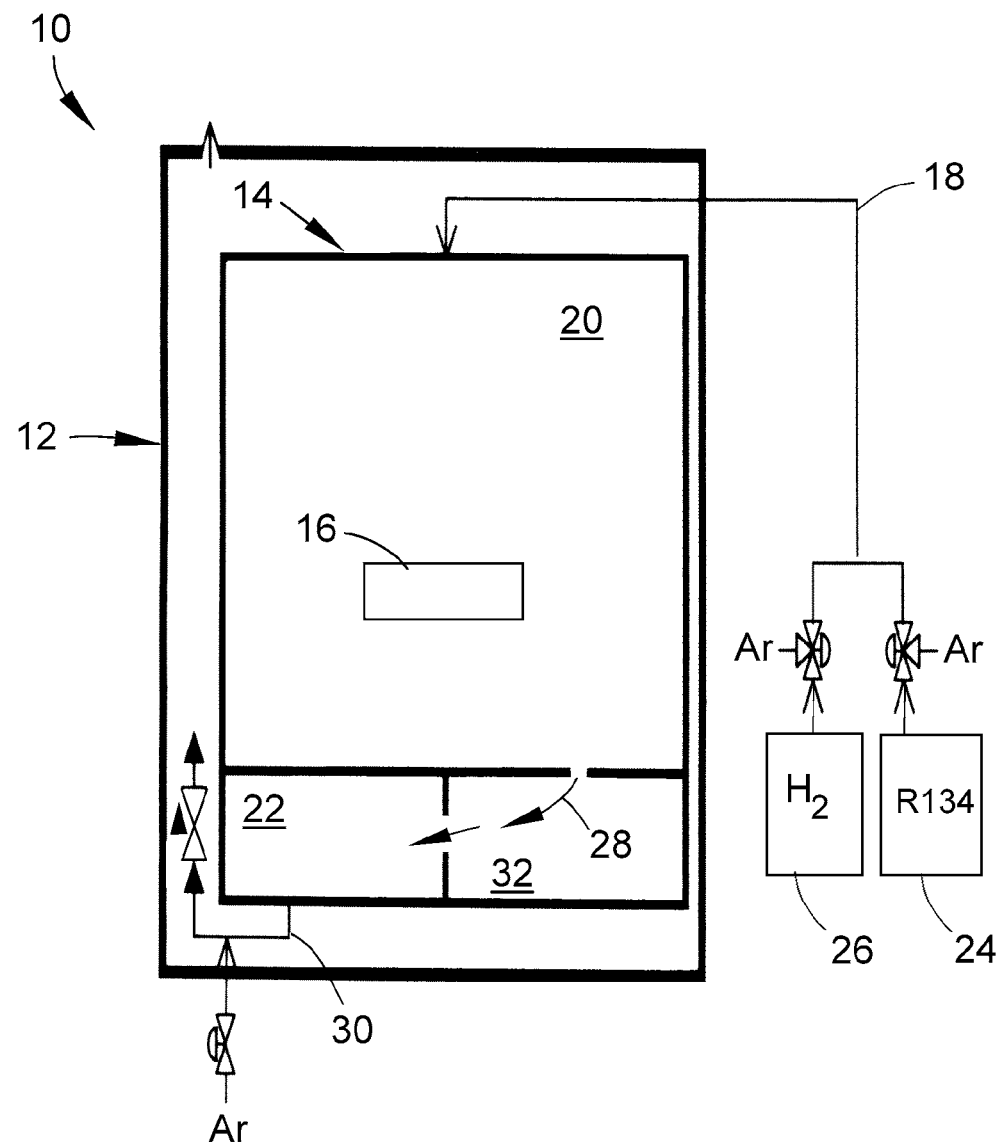
FIG. 1 is a schematic representation of a high temperature furnace containing a cleaning retort having at least a cleaning region and a scrubbing region.

Referring to the drawings wherein identical reference numerals denote the same elements throughout the various views, FIG. 1 shows an exemplary system 10 including a high temperature furnace 12 including a cleaning retort 14 into which parts or components 16 in need of cleaning are placed. Cleaning retort 14 is capable of containing the appropriate cleaning gasses introduced by gas stream 18. The cleaning retort 14 includes at least two regions. A first region 20 is sized and dimensioned to hold parts and components 16 in need of cleaning. A second region 22 is operable as an HF scrubbing unit (fluorine getter). In an exemplary process, the retort 14 is preheated and purged with, for example, argon. Thereafter, a feedstock of a non-hazardous fluorine-containing compound 24 and hydrogen gas 26 are introduced into the retort 12. The fluorine-containing compound reacts at temperature with hydrogen to form HF gas (gas stream 18) in the retort 14.

The HF gas then acts to clean the parts via the conversion of oxides to semi-volatile fluorides which are carried away from the parts or components 16 by the flowing gas stream in a fluoride ion cleaning process. In an exemplary embodiment, prior to exiting the retort, the initial effluent stream 28 is scrubbed of fluorine in the second region 22 (fluorine getter) such that the scrubbed effluent stream 30 exiting the retort is substantially free of fluorine, and therefore less hazardous then in traditional fluoride ion cleaning processes. Optionally, the cleaning retort 14 may include a third region 32 (metal getter) operable to remove a majority of the metals found in the initial effluent stream 28 such as Al and Cr as discussed below.

Figure 2:
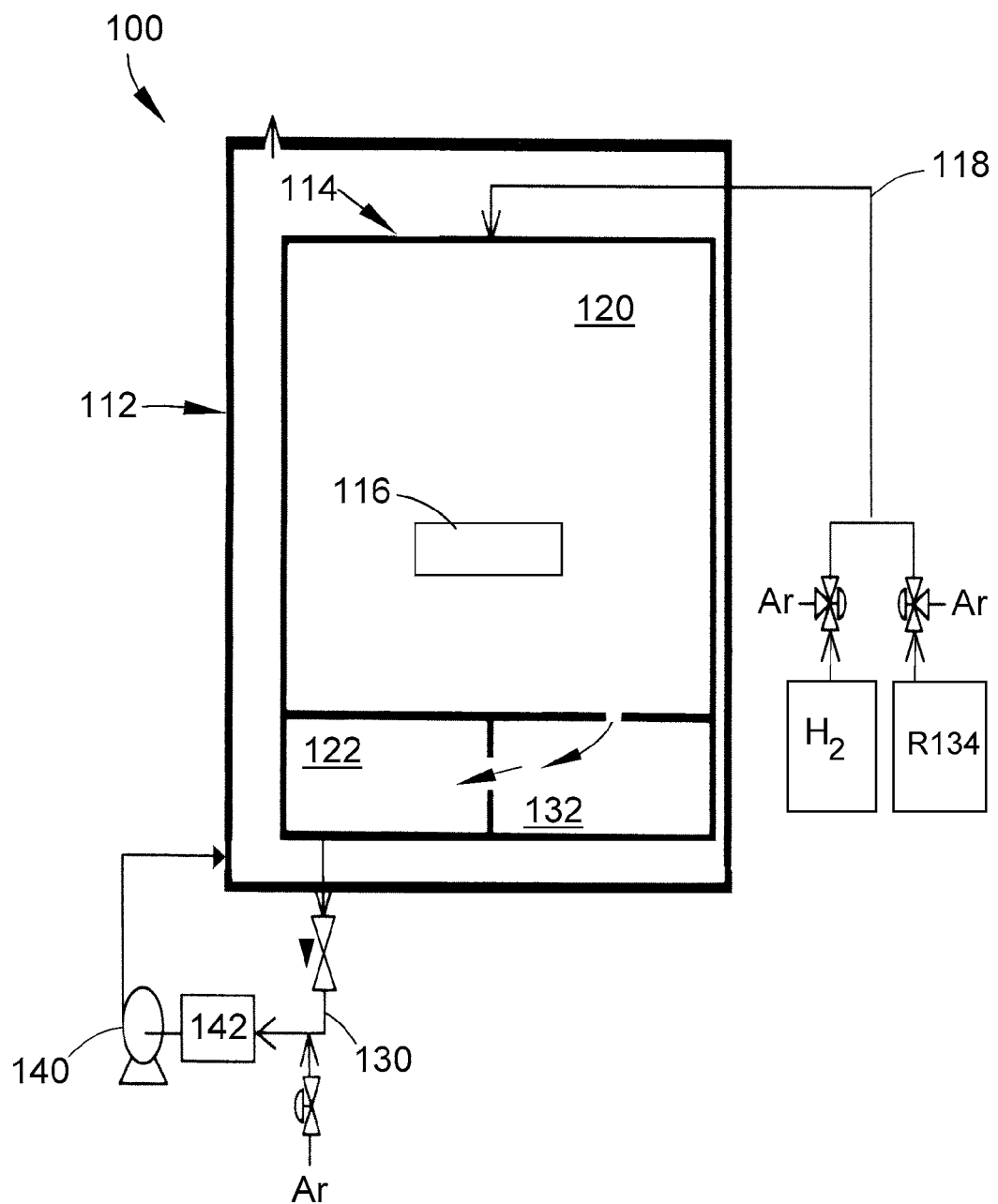
FIG. 2 is a schematic representation of a high temperature furnace similar in certain respects to the furnace shown in FIG. 1 and including a vacuum pump.

In an exemplary embodiment, illustrated in FIG. 2, a similar system 100 is utilized. System 100 includes a high temperature furnace 112 including a cleaning retort 114 into which parts or components 116 in need of cleaning are placed. The cleaning retort 114 includes at least regions 120 and 122 operationally similar to regions 20, 22. Optionally, retort 114 may include region 132 as a metal getter, as described above. In an exemplary embodiment, the scrubbed effluent stream 130 is connected to a vacuum pump 140 operable to pulse or modulate pressure in the retort 114 to help evaporate semi-volatile fluorides from the surface of the parts 116 and to provide fresh HF gas 118 into cracks on the parts. A dessicant 142 may be placed in the effluent stream 130 to prevent moisture contamination of the vacuum pump. Alternately, a liquid ring type vacuum pump could be used to provide vacuum without the dryer.

In an exemplary embodiment, hydrogen fluoride gas (HF) is generated in-situ from at least one of a liquid or gaseous halogenated feedstock combined with hydrogen, and subsequently destructed in-situ, thereby eliminating some of the hazards associated with prior fluoride ion cleaning (FIC) processes. Generation of the HF gas, cleaning of the components, and scrubbing of the effluent stream can be accomplished at temperatures of between about 1500 to about 2200° F. (about 816 to about 1204° C.) over durations of about 1 to about 8 hours. The feedstock may comprise a chlorofluorocarbon (CFC) and/or a hydrofluorocarbon (HFC) compound. As a particular example, a non-toxic, fluorine-containing compound such as Freon 134a (tetrafluoroethane) is used as a feedstock and thermally decomposed after mixing with hydrogen to form HF:

$$C_2H_2F_4 + 5H_2 \rightarrow 4HF + 2CH_4 \text{ (in situ HF generation)}$$

The HF thus generated is utilized in a Fluoride Ion Cleaning process:

$$6HF + Al_2O_3 \rightarrow 2AlF_3 + 3H_2O$$

$$6HF + Cr_2O_3 \rightarrow 2CrF_3 + 3H_2O \text{ (cleaning)}$$

$$H_2O + CH_4 \rightarrow CO + H_2$$

The effluent stream is treated to remove HF prior to exhausting from the retort. The process has an optional step which removes the majority of the metals found in the initial effluent stream such as Al and Cr. The metal fluoride compounds may be substantially stripped of their metal content so that reconstituted HF may be recycled to the cleaning process. Alternately the reconstituted HF may be more readily removed in a subsequent scrubbing unit.

These elements exist in the effluent stream as fluorides, and can be removed by reducing them to a metal alloy by combining them with a pure sacrificial metal such as iron:

$$2AlF_3 + 2Fe + 3H_2 \rightarrow 2AlFe + 6HF \text{ (and)}$$

$$CrF_2 + Fe + H_2 \rightarrow CrFe + 2HF \text{ (metal getting)}$$

In the fluorine removal step, a packed bed is used to contact fluorine-containing species with a sacrificial high melting temperature material. The reactions result in formation of stable, high melting point fluoride compounds which may be subsequently disposed of after the retort has been returned to room temperature. In the preferred embodiment, the fluorine scrubber contains a fluorine getter such as CaO:

$$2HF + CaO \rightarrow CaF_2 + H_2O \text{ (fluorine getting)}$$

Other salts or combinations of salts may replace CaO. For example a combination of CaO and NaCl may be mixed with Si. This fluorine-getter mixture may allow substantially all of the HF to be removed from the gas streams at elevated temperatures. The process generates non-hazardous, readily disposable solid wastes. The gaseous by-products may be combusted in the furnace hot zone resulting in $CO_2$ and water vapor emissions.

The result of this combination of in-situ generation and destruction of HF allows for tailoring the cleaning processes to the components requiring cleaning, rather than running a single common cycle for all parts regardless of the difficulty of cleaning certain components.

Thus, the exemplary embodiments disclosed herein provide an effective cleaning method without the associated downfalls of the use of bottled HF gas as a source material in situ generation of HF. Further, in situ removal of excess HF from the effluent stream reduces or eliminates the need for a separate scrubber system.

Embodiments disclosed herein present systems and methods of fluoride ion cleaning in which HF gas is generated in-situ in the cleaning retort using a liquid or gaseous halogenated feedstock combined with hydrogen at high temperatures such that no HF precursor material is required to be placed in the cleaning retort prior to initiation of the cleaning cycle and no HF gas is employed as a feedstock This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method comprising:
   a) generating hydrogen fluoride (HF) gas in-situ in a cleaning retort;
   b) subsequent to (a), contacting a part in need of cleaning with the generated HF gas and thereby forming metal fluoride compounds;
   c) scrubbing an initial effluent stream in-situ to substantially remove residual HF gas therefrom;
   d) passing the scrubbed effluent gas stream out of the cleaning retort; and
   e) reacting the metal fluoride compounds with a non-volatile alloying agent to form metal and reconstitute HF.

2. The method according to claim 1 where the feedstock comprises at least one of a chlorofluorocarbon (CFC) or hydrofluorocarbon (HFC) compound.

3. The method according to claim 2 wherein the feedstock comprises tetrafluoroethane (HFC-134a).

4. The method according to claim 1 wherein in (c), scrubbing the effluent stream comprises passing the effluent stream over a packed bed reactor comprising a material capable of forming a stable, non-volatile, high melting temperature fluoride compound upon reaction with at least one of HF gas, aluminum fluoride ($AlF_3$), or chromium fluoride ($CrF_2$).

5. The method according to claim 4 wherein the material comprises CaO.

6. The method according to claim 1 further comprising: modulating a pressure in the cleaning retort during at least a part of (b).

7. A method comprising:
   a) introducing a liquid or gaseous halogenated feedstock into a cleaning retort;
   b) during at least a part of (a), introducing hydrogen gas into the cleaning retort;
   c) heating the cleaning retort to a temperature sufficient to generate HF gas in-situ through a reaction of the feedstock introduced in (a) and the hydrogen gas introduced in (b); and
   d) utilizing the HF gas generated in-situ from the reaction in (c) and in-situ reconstituted HF in the cleaning retort to form metal fluoride compounds by contacting a part in need of cleaning with the HF gas generated in (c), and then converting the metal fluoride compounds to form metal and the in-situ reconstituted HF by reaction of the metal fluoride compounds with a non-volatile alloying agent.

8. The method according to claim 7 wherein the non-volatile alloying agent is iron.

9. The method according to claim 7 wherein the feedstock in (a) includes at least one of a chlorofluorocarbon (CFC) and hydrofluorocarbon (HFC) compound.

10. The method according to claim 7 wherein the feedstock includes tetrafluoroethane (HFC-134*a*).

11. The method according to claim 7 further comprising:

e) generating a final effluent stream exiting the cleaning retort that is substantially free of HF, $F_2$ and fluorine-containing compounds.

12. The method according to claim 11 wherein in (e) generating the final effluent stream includes in-situ scrubbing of an initial effluent stream by passing the initial effluent stream over a packed bed reactor comprising a material capable of forming a stable, non-volatile, high melting temperature fluoride compound upon reaction with at least one of HF gas, aluminum fluoride ($AlF_3$), or chromium fluoride ($CrF_2$).

13. The method according to claim 12 wherein the material comprises CaO.

* * * * *